(12) United States Patent
Barreiro

(10) Patent No.: US 8,094,181 B2
(45) Date of Patent: *Jan. 10, 2012

(54) METHOD AND SYSTEM OF MULTILOCATION VIDEO CONFERENCING

(75) Inventor: Giovanna Barreiro, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 444 days.

This patent is subject to a terminal disclaimer.

(21) Appl. No.: 12/334,607

(22) Filed: Dec. 15, 2008

(65) Prior Publication Data

US 2009/0096860 A1    Apr. 16, 2009

Related U.S. Application Data

(63) Continuation of application No. 11/116,054, filed on Apr. 27, 2005, now Pat. No. 7,468,738.

(51) Int. Cl.
   *H04N 7/14*    (2006.01)
(52) U.S. Cl. ............... 348/14.08; 348/14.09; 348/14.12
(58) Field of Classification Search .... 348/14.01–14.16, 348/154; 370/260, 261
   See application file for complete search history.

(56) References Cited

U.S. PATENT DOCUMENTS

| | | | |
|---|---|---|---|
| 5,548,324 A | 8/1996 | Downs et al. | |
| 5,625,410 A | 4/1997 | Washino et al. | |
| 5,745,161 A * | 4/1998 | Ito | 348/14.09 |
| 5,786,746 A | 7/1998 | Lombardo et al. | |
| 5,963,246 A | 10/1999 | Kato | |
| 6,124,881 A | 9/2000 | Terui et al. | |
| 6,233,428 B1 | 5/2001 | Fryer | |
| 6,441,841 B1 | 8/2002 | Tanoi | |
| 6,515,695 B1 | 2/2003 | Sato et al. | |
| 2001/0053132 A1 * | 12/2001 | Attimont et al. | 370/260 |
| 2003/0023742 A1 | 1/2003 | Allen et al. | |
| 2003/0142200 A1 | 7/2003 | Canova, Jr. et al. | |
| 2004/0066456 A1 * | 4/2004 | Read | 348/207.1 |
| 2004/0091086 A1 | 5/2004 | Ortel | |
| 2004/0119814 A1 | 6/2004 | Clisham et al. | |
| 2004/0148635 A1 | 7/2004 | Merchant | |
| 2004/0201710 A1 | 10/2004 | Uchihashi et al. | |
| 2005/0128283 A1 * | 6/2005 | Bulriss et al. | 348/14.1 |
| 2006/0077253 A1 * | 4/2006 | VanRiper et al. | 348/143 |

* cited by examiner

*Primary Examiner* — Melur Ramakrishnaiah
(74) *Attorney, Agent, or Firm* — Brooks Kushman P.C.

(57) ABSTRACT

A conferencing unit allows first persons at remote locations to communicate with second persons at a central location. The unit receives respective videos of the first persons and a video of the second persons and outputs: the videos of the first persons to a central display at the central location such that the first persons are displayed on respective portions of the central display; the video of the second persons to remote displays respectively at the remote locations such that the second persons are displayed on one portion of each remote display; the video of one of the first persons to the display of another one of the first persons such that the one person is displayed on another portion of this display; and the video of the other person to the display of the one person such that the other person is displayed on another portion of this display.

19 Claims, 2 Drawing Sheets

METHOD AND SYSTEM OF MULTILOCATION VIDEO CONFERENCING

CROSS-REFERENCE TO RELATED APPLICATIONS

This application is a continuation of U.S. application Ser. No. 11/116,054, filed Apr. 27, 2005, now U.S. Pat. No. 7,468,738 which is hereby incorporated by reference in its entirety.

BACKGROUND OF THE DISCLOSURE

1. Field of the Disclosure

The present disclosure relates to methods and systems of video conferencing between individuals located at remote locations.

2. Background Art

Many childcare/after school facilities are implementing a system to let parents watch their children over a secure internet connection. The typical solution consists of one camera per classroom/play area. This camera may be strategically located so the whole class is recorded at all times. Accounts are assigned to the parents which allows the parents to login from a computer and watch a live video of their children's class at any time during the centers hours of operation.

One problem with this system is that operation is limited to one-way communications in that the parents can see their children but the children cannot see their parents. Another problem is that there is no audio communication with the parents such that the parents may only see, and not hear, their children.

Enterprise video conferencing employs a similar system to support two-way video conferencing but it too is problematic in that it is limited to one-to-many communications, i.e., everyone sees the same images and the participants are unable to separately communicate with each other.

DETAILED DESCRIPTION OF THE PREFERRED EMBODIMENT(S)

Figure 1:
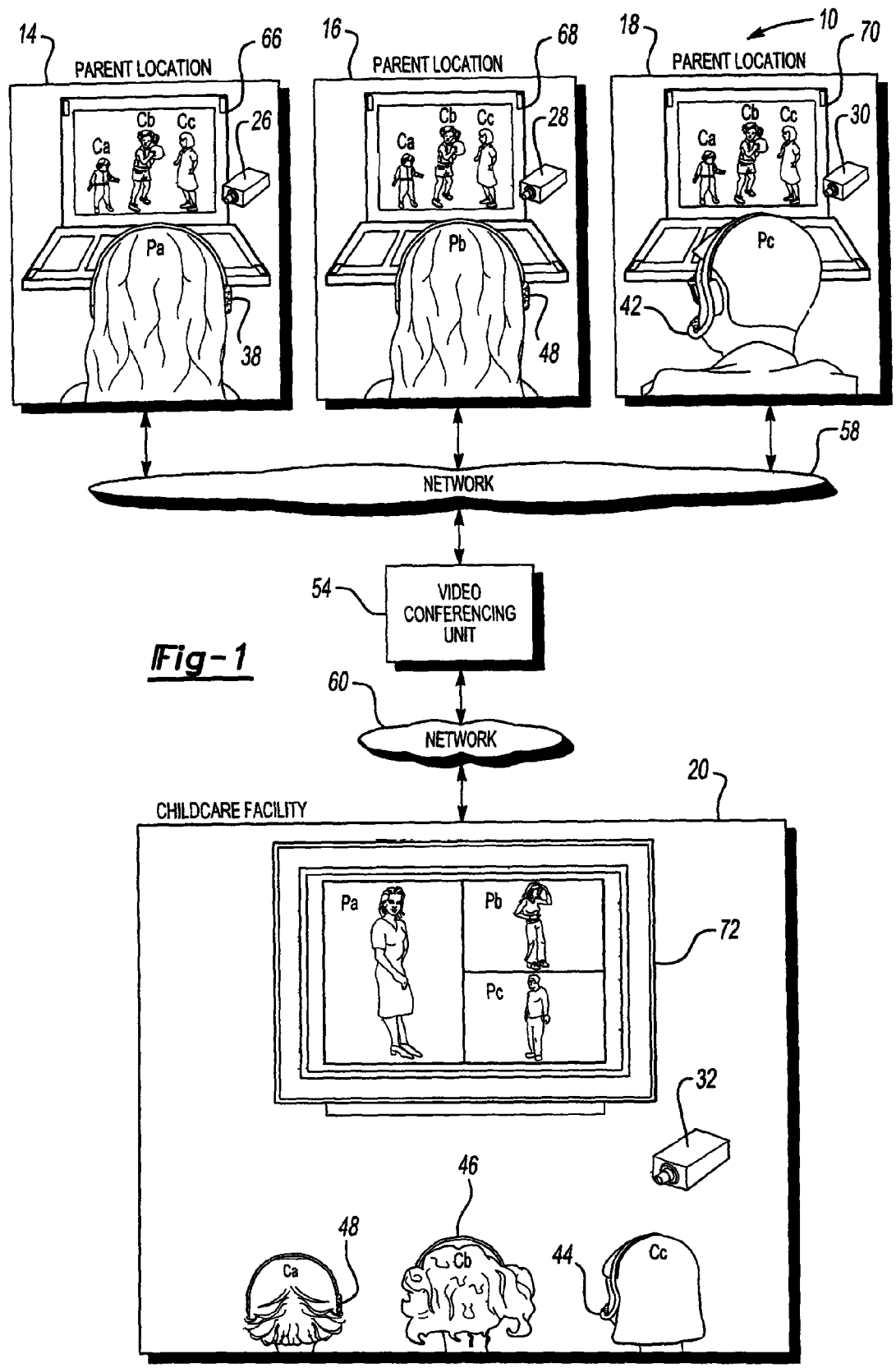
FIG. 1 illustrates a system of providing video conferencing in accordance with one non-limiting aspect of the present disclosure.

One non-limiting aspect of the present disclosure relates to a system which allows video conferencing and overcomes the above-identified deficiencies. The system may allow multiple users to be logged into the same account from separate locations. The system may allow multiple participants to view each other. The multiple participants may also separately communicate with each other, including when video of other participants is displayed on a common display.

The present disclosure provides a method of allowing a first group of persons at remote locations to communicate with a second group of persons at a central location. A first person of the first group of persons is at a first remote location and a second person of the first group of persons is at a second remote location. The method includes receiving, by a conferencing unit, videos of the second group of persons recorded by cameras at the central location and videos of the first group of persons recorded by cameras respectively at the remote locations. The conferencing unit outputs: the videos of the first group of persons from the conferencing unit to a central display at the central location such that the first group of persons are displayed on respective portions of the central display for viewing by the second group of persons; one of the videos of the second group of persons from the conferencing unit to remote displays respectively at the remote locations such that the second group of persons are displayed on one portion of each remote display for viewing by the first group of persons; the video of the first person from the conferencing unit to the remote display at the second remote location such that the first person is displayed on another portion of the remote display at the second remote location for viewing by the second person; and the video of the second person from the conferencing unit to the remote display at the first remote location such that the second person is displayed on another portion of the remote display at the first remote location for viewing by the first person.

The present disclosure provides a system of allowing a first group of persons at remote locations to communicate with a second group of persons at a central location. A first person of the first group of persons is at a first remote location and a second person of the first group of persons is at a second remote location. The system includes a conferencing unit configured to receive a video of the second group of persons and to receive respective videos of the first group of persons. The conferencing unit is further configured to output: the videos of the first group of persons to a central display at the central location such that the first group of persons are displayed on respective portions of the central display for viewing by the second group of persons; the video of the second group of persons to remote displays respectively at the remote locations such that the second group of persons are displayed on one portion of each remote display for viewing by the first group of persons; the video of the first person to the remote display at the second remote location such that the first person is displayed on another portion of the remote display at the second remote location for viewing by the second person; and the video of the second person to the remote display at the first remote location such that the second person is displayed on another portion of the remote display at the first remote location for viewing by the first person.

The above features and advantages, along with other features and advantages of the present disclosure, are readily apparent from the following detailed description of the disclosure when taken in connection with the accompanying drawings.

FIG. 1 illustrates a system 10 of providing video conferencing in accordance with one non-limiting aspect of the present disclosure. System 10 relates to providing video and audio communications between multiple locations 14-20. For exemplary purposes, the operation of system 10 is described with respect to a childcare environment where parents video conference with their children at a childcare location 20 from a number of remote locations 14-18.

This exemplary description, however, is not intended to limit the scope of the present disclosure. Rather, the present disclosure fully contemplates any number of environments and supporting video conferencing between any number of locations, and not necessarily between individuals having a parent-child relationship, such as between one or more satellite offices and a central office.

Each of parent locations 14-18 and childcare facility 20 may include one or more video cameras 26-32 and one or more audio communicators 38-48. Video cameras 26-32 may be configured to record video and to transport the recorded video to a video conferencing unit 54. Audio communicators 38-48 may be configured to record audio and to transport the recorded audio to video conferencing unit 54.

The devices at parent locations 14-18 and childcare facility 20 may communicate with video conferencing unit 54 over one or more networks 58-60. The networks may be wireline and/or wireless networks which transport electrical signals according to any number of protocols and standards. The present disclosure contemplates any number of transmission mediums and configurations for supporting electrical transmissions and is not intended to be limited to any particular configuration.

Video conferencing unit 54 may be a standalone feature located remotely from parent locations 14-18 and childcare facility 20 and/or the functionality associated therewith may be an integrated into one of the items located at parent locations 14-18 and childcare facility 20. Video conferencing unit 54 may be an application, program, server, processor, or other feature configured to perform operations in accordance with the present disclosure. As such, the present disclosure is not intended to be limited to any particular configuration for video conferencing unit 54 and fully contemplates the use of any number of features, devices, and programs to support the functionality associated therewith.

Each of parent locations 14-18 and childcare facility 20 may include a monitor, display, television, computer, or other device 66-72 for displaying the recorded video and playing the recorded audio. Video conferencing unit 54 may be configured to output signals for displaying video recorded by the one or more parent video cameras 26-30 on a common display 72 located at childcare facility 20. Video conferencing unit 54 may be configured to simultaneously display video for each active parent on common display 72 so that each active parent is viewable within at least a portion of common display 72.

Video conferencing unit 54 may host a webpage or perform other operations to facilitate viewing the video at childcare facility 20. The webpage may be accessed, such as after a login process, to view the video and to facilitate determining the active parents. The active parents may be generally characterized as those parents desiring to view video and/or to listen to audio from the childcare facility. As shown in FIG. 1, three parents, labeled PA-PC, are active and shown in common display 72 while each child, labeled CA-CC, may view common display 72 to view their parents. Of course, other children of non-active parents may view the active parents and other personnel, such as childcare facility providers, may also view the active parents.

Video conferencing unit 54 may be configured to output signals from one or more of childcare video camera(s) 32 to displays, monitors, televisions, or other devices at the parent locations, which for exemplary purposes are shown as computer terminals 66-70. Video conferencing unit 54 may host a webpage or perform other operations to facilitate displaying the video at parent locations 14-18.

Video conferencing unit 54 may include a login process or other authorizing application to insure only authorized parents are receiving video and to insure only authorized parents are displaying video at childcare facility 20. As shown, video from a common room, childcare video camera 32 may be commonly outputted to parent locations 14-18. The room may be associated with a playroom or other general congregational room at childcare facility 20.

Childcare facility 20 may include any number of video cameras within any number of rooms or locations at childcare facility 20 which may record video for display at parent locations 14-18. Optionally, multiple childcare cameras may be leveraged off of to display more than one video at parent locations 14-18, such as through picture-in-picture applications or split-screen viewing applications. Video conferencing unit 54 may also be configured to distribute video recorded at parent locations 14-18 so that the parents may view their children and the other parents in a split-screen.

Video conferencing unit 54 may be configured to provide separate channels or other communications mediums between audio communicators 38-42 located at parent locations 14-18 and audio communicators 44-48 located at childcare facility 20. Such audio communication may operate simultaneously with the above-described video so as to permit the parent locations to individually communicate with one or more children and/or one or more childcare facility providers.

The audio communications may be separate in that the communications on each channel are separately distinguished from the other audio communications so that other individuals are prevented from listening to the audio communications. The parents may communicate with their children without other individuals hearing the audio. In this manner, common video may be used by multiple individuals while dedicated or separate audio communications are established between various individuals.

Video conferencing unit 54 may be configured to support broadcast operations. The broadcast operations may allow parents, children, or childcare providers to interrupt the separate audio communications in order to deliver a broadcast communication to each individual. For example, this functionality may be used by one of the providers to broadcast an audio message or otherwise simultaneously communicate to each of the parents, such as to support a conference call. Furthermore, messages may be recorded or otherwise stored for messaging with non-active parents in a similar fashion.

Video conferencing unit 54 may be configured to control operation of the childcare and parent video cameras 26-32. The control may include selectively determining which one or more cameras are active, areas recorded by the cameras (i.e., by control a direction or pointing of the cameras), zooming features of the cameras, and other features of camera operation. Optionally, video conferencing unit 54 may receive requests or commands from parent locations 14-18 for controlling one or more of the childcare cameras, such as to permit parents to maneuver childcare camera(s) 32 in order to locate their children within childcare facility 20. If childcare facility 20 includes multiple cameras, then various parents may simultaneously control different cameras, such as to locate their respective children.

Video conferencing unit 54 may be configured with rules and regulations for governing video and audio communications. The rules and regulations may limit operation and control of any one of the devices in system 10 according to any number of rules and regulations. For example, operation and control of childcare video camera(s) 32 may be limited to certain periods of the day, to limited number of parents, i.e., based on subscription status or other parameters, and/or to certain locations within the childcare facility, i.e. to provide privacy in certain portions of the facility.

Figure 2:
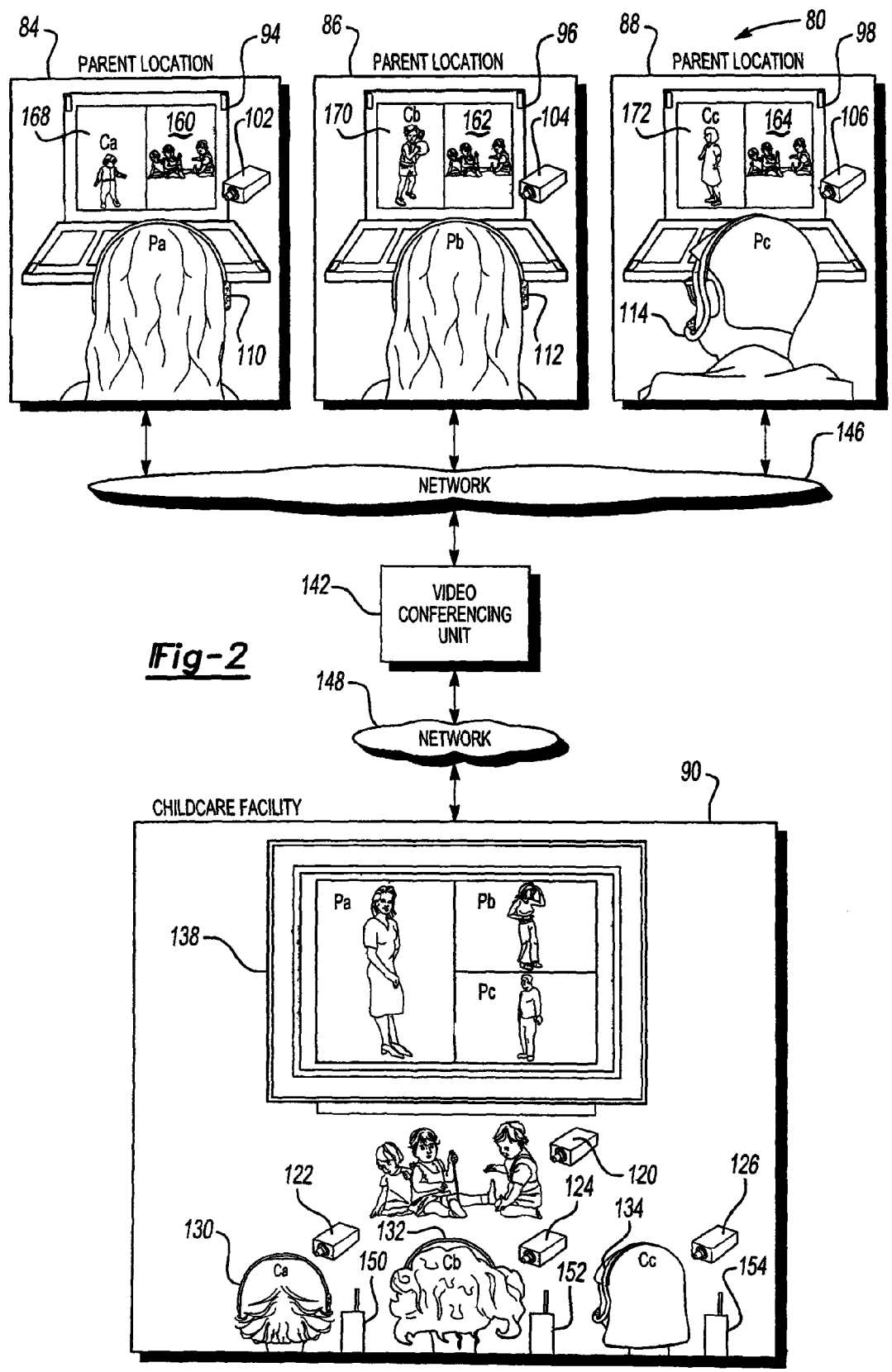
FIG. 2 illustrates a multi-camera system for supporting video conferencing in accordance with one non-limiting aspect of the present disclosure.

FIG. 2 illustrates a multi-camera system 80 for supporting video conferencing in accordance with one non-limiting aspect of the present disclosure. System 80 is described with continued reference to the exemplary parent-child example where parents desire to video conference with their children from remote locations while the children are at a childcare facility.

System 80 may include a number of parent locations 84-88 and a childcare facility 90. Parent locations 84-88 may include displays 94-98, video cameras 102-106, and audio communicators 110-114. Childcare location 90 may include cameras 120-126, audio communicators 130-134, and one or more displays 138. Each of these devices may be configured to communicate with a video conferencing unit 142 over one or more networks 146-148 and/or other features may be provided at each location 84-90 to facilitate operations similar to those describe above with respect to FIG. 1.

Video conferencing unit 142 may be configured to output signals for displaying video recorded by one or more parent video cameras 102-106 on a common display 138 located at childcare facility 90. Video conferencing unit 142 may be configured to simultaneously display video for each active parent on common display 138 so that each active parent is viewable within at least a portion of common display 138.

Each of the children may include an identification unit 150-154. Identification units 150-154 may be a wireless transmitter or other unit which communicates with video conferencing unit 142 and/or another feature at childcare facility 90. Video conferencing unit 142 may be configured to identify a location, image, or other identifying characteristics of the children as a function of their identification units 150-154. Video conferencing unit 142 may then use this information to associate each identified child with recorded video.

Childcare facility 90 may include a number of cameras 120-126 in different rooms or areas of childcare facility 90. Each of cameras 120-126 may record fixed portions of childcare facility 90 and/or they may be controlled by video conferencing unit 142 or the parents to record variable portions of childcare facility 90. Video conferencing unit 142 may track the video recording as a function of the children associated therewith. For example, identification units 150-154 may be used to locate children within childcare facility 90 and to cross-reference their locations with one or more cameras 120-126 which may be recording that area. This may be repeated for each identification unit 150-154 to facilitate associating the children with the recorded video.

Video conferencing unit 142 may be configured to determine which video from one or more childcare video cameras 120-126 is associated with each child so that video displayed on parent displays 94-98 includes video of the child associated with the viewing parent. As shown, each parent, labeled PA-PC, may view images of their children, labeled CA-CC, on their respective displays 94-98. This video may change to video from other cameras 120-126 as the children move throughout the childcare facility so that each parent may constantly view their child.

In some cases, different parents may view video from the same camera 120-126 if their children are being recorded by the same camera 120-126. Optionally, if multiple cameras 120-126 are recording the same child, the parent may selectively control which video is displayed or selectively control split screen viewing to view two or more of the videos. Parent locations 84-88 may also view other video from childcare facility 90, which may or may not include their children. As shown, each parent display includes a portion 160-164 showing video from a common video camera 120 and a portion 168-172 showing video from a camera associated with their child.

The present disclosure contemplates any number of applications, environments, and configurations which leverage off of the functionality described above with respect to FIGS. 1 and 2. The present disclosure fully contemplates other applications which are not dependent on parent-child relationships. The exemplary parent-child descriptions is only provided to describe one example where individuals may desire to communicate over common video while simultaneously communicating over separate audio channels.

This arrangement, however, would apply equally to other industries and other enterprise level solutions where it may be desirable for multiple individuals to video conference. For example, on such analogy may be made for manufacturing plant and controller applications wherein the manufacturing plant is similar to the childcare facility (central office) and the controllers or program managers are the parents (satellite office). As such, for the purposes of the present disclosure, the usage of parent, child, and childcare facility is not intended to limit the scope and contemplation of the present disclosure and is not intended to limit its application to any patriarchal relationship or to only childcare environments.

While embodiments of the presesnt disclosure have been illustrated and described, it is not intended that these embodiments illustrate and describe all possible forms of the present disclosure. Rather, the words used in the specification are words of description rather than limitation, and it is understood that various changes may be made without departing from the spirit and scope of the present disclosure.

What is claimed is:

1. A method of allowing a first group of persons at remote locations to communicate with a second group of persons at a central location, wherein a first person of the first group of persons is at a first remote location, a second person of the first group of persons is at a second remote location, and a third person of the first group of persons is at a third remote location, the method comprising:

receiving, by a conferencing unit, videos of the second group of persons recorded by cameras at the central location;

receiving, by the conferencing unit, videos of the first group of persons recorded by cameras respectively at the remote locations;

outputting the videos of the first group of persons from the conferencing unit to a central display at the central location such that the first group of persons are displayed on respective portions of the central display for viewing by the second group of persons;

outputting one of the videos of the second group of persons from the conferencing unit to remote displays respectively at the remote locations without outputting the videos of either the first person or the second person to the remote display at the third remote location such that the second group of persons are displayed on one portion of each remote display for viewing by the first group of persons and such that the first person and the second person are not displayed on the remote display at the third remote location;

outputting the video of the first person from the conferencing unit to the remote display at the second remote location without outputting the video of the third person from the conferencing unit to the remote display at the second remote location such that the first person is displayed on another portion of the remote display at the second remote location for viewing by the second person and such that the third person is not displayed on the remote display at the second remote location; and outputting the video of the second person from the conferencing unit to the remote display at the first remote location without outputting the video of the third person from the conferencing unit to the remote display at the first remote location such that the second person is displayed on another portion of the remote display at the first remote location for viewing by the first person and such that the third person is not displayed on the remote display at the first remote location.

2. The method of claim 1 further comprising:
selectively controlling by the conferencing unit which video from the cameras at the central location is displayed on the remote displays.

3. The method of claim 2 further comprising:
permitting, by the conferencing unit, persons of the first group of persons to selectively determine which video from the cameras at the central location is displayed on the remote displays.

4. The method of claim 3 further comprising:
remotely controlling by the conferencing unit the cameras at the central location; and
allowing, by the conferencing unit, persons of the first group of persons to selectively control operation of the cameras at the central location.

5. The method of claim 2 further comprising:
including an identification unit on one or more of persons of the second group of persons;
associating, by the conferencing unit, persons of the second group of persons with videos from the cameras at the central location as a function of the identification units; and
determining, by the conferencing unit, which videos from the cameras at the central location are associated with each person of the second group of persons such that a video of the second group of persons which is displayed on a remote display includes a person of the second group of persons selected by a person of the first group of persons viewing the remote display.

6. The method of claim 1 further comprising:
receiving, by the conferencing unit, audio recorded by audio communicators associated with the first and second groups of persons; and
selectively communicating from the conferencing unit the audio between the first and second groups of persons.

7. The method of claim 6 wherein:
the conferencing unit communicates the audio such that the first and second persons communicate with a person of the second group of persons without any other of the persons hearing the audio.

8. The method of claim 6 further comprising:
permitting, by the conferencing unit, at least one person of either the first or second group of persons to interrupt videos from being outputted to any of the displays such as to permit the interrupting person to broadcast video to the displays.

9. The method of claim 1 further comprising:
limiting, by the conferencing unit, video recorded by the cameras at the central location and video displayed by the central display as a function of predefined rules.

10. The method of claim 1 further comprising:
allowing, by the conferencing unit, the first group of persons to selectively determine whether their video is displayed on the central display.

11. A system of allowing a first group of persons at remote locations to communicate with a second group of persons at a central location, wherein a first person of the first group of persons is at a first remote location, a second person of the first group of persons is at a second remote location, and a third person of the first group of persons is at a third remote location, the system comprising:
a conferencing unit configured to receive a video of the second group of persons and to receive respective videos of the first group of persons;
wherein the conferencing unit is configured to output the videos of the first group of persons to a central display at the central location such that the first group of persons are displayed on respective portions of the central display for viewing by the second group of persons;
wherein the conferencing unit is configured to output the video of the second group of persons to remote displays respectively at the remote locations without outputting the videos of either the first person or the second person to the remote display at the third remote location such that the second group of persons are displayed on one portion of each remote display for viewing by the first group of persons and such that the first person and the second person are not displayed on the remote display at the third remote location;
wherein the conferencing unit is configured to output the video of the first person to the remote display at the second remote location without outputting the video of the third person to the remote display at the second remote location such that the first person is displayed on another portion of the remote display at the second remote location for viewing by the second person and such that the third person is not displayed on the remote display at the second remote location;
wherein the conferencing unit is configured to output the video of the second person to the remote display at the first remote location without outputting the video of the the third person to the remote display at the first remote location such that the second person is displayed on another portion of the remote display at the first remote location for viewing by the first person and such that the third person is not displayed on the remote display at the first remote location.

12. The system of claim 11 further comprising:
audio communicators configured to support audio communications between persons of the first and second groups of persons.

13. The system of claim 12 wherein:
the conferencing unit is further configured to support separate audio communications such that the first and second persons communicate with a person of the second group of persons without any other of the persons hearing the audio.

14. The system of claim 11 further comprising:
identification units respectively associated with the persons of the second group of persons;
wherein the conferencing unit is further configured to track the persons of the second group of persons based on the identification units.

15. The system of claim 14 wherein:
the conferencing unit is further configured to control operation of the camera at the central location based on the tracking.

16. A system of allowing a first group of persons at remote locations to communicate with a second group of persons at a central location, wherein a first person of the first group of persons is at a first remote location, a second person of the first group of persons is at a second remote location, and a third person of the first group of persons is at a third remote location, the system comprising:
a conferencing unit configured to receive a video of the second group of persons and to receive videos and audio communications of the first group of persons; and
an audio communicator associated with a person of the second group of persons and configured to provide audio communications of the person of the second group of persons to the conferencing unit and to receive audio communications for the person of the second group of persons to hear;

wherein the conferencing unit is further configured to output the videos of the first group of persons to a central display at the central location such that the first group of persons are displayed on respective portions of the central display for viewing by the second group of persons, output the video of the second group of persons to remote displays respectively at the remote locations without outputting the videos of either the first person or the second person to the remote display at the third remote location such that the second group of persons are displayed on a portion of each remote display for viewing by the first group of persons and such that the first person and the second person are not displayed on the remote display at the third remote location, output the video of the first person to the remote display at the second remote location without outputting the video of the third person to the remote display at the second remote location such that the first person is displayed on another portion of the remote display at the second remote location for viewing by the second person and such that the third person is not displayed on the remote display at the second remote location, and output the video of the second person to the remote display at the first remote location without outputting the video of the third person to the remote display at the first remote location such that the second person is displayed on another portion of the remote display at the first remote location for viewing by the first person and such that the third person is not displayed on the remote display at the first remote location;

wherein the conferencing unit is further configured to output the audio communications of the person of the second group of persons to the first and second remote locations for the first and second persons to hear and to output the audio communications of the first and second persons to the audio communicator for the person of the second group of persons to hear.

17. The system of claim 16 further comprising:
an identification unit associated with the person of the second group of persons;
wherein the conferencing unit is operable with the identification unit to determine the location of the person of the second group of persons in the central location;
wherein the conferencing unit is configured to control the video camera at the central location to provide to the conferencing unit the video of the second group of persons based on the location of the person of the second group of persons.

18. The system of claim 16 further comprising:
an identification unit associated with the person of the second group of persons; and
a second video camera at the central location configured to provide a video of the second group of persons to the video conferencing unit;
wherein the conferencing unit is operable with the identification unit to determine the location of a person of the second group of persons;
wherein the conferencing unit is configured to control the second camera to provide a video of the person of the second group of persons to the conferencing unit and to output this video to at least one of the remote displays such that the person of the second group of persons is displayed on a portion of the at least one of the remote displays.

19. The system of claim 16 further comprising:
audio communicators respectively associated with at least some other persons of the second group of persons to provide audio communications of the associated persons of the second group of persons to the conferencing unit and to receive audio communications from the conferencing unit for the associated persons of the second group of persons to hear;
wherein the conferencing unit is configured to respectively output the audio communications of the at least some of the other persons of the second group of persons to the remote locations for the first group of persons to hear and is configured to respectively output the audio communications of the first group of persons to the audio communicators associated with the at least some of the other persons of the second group of persons to hear.

\* \* \* \* \*